United States Patent
Ponomarenko

(10) Patent No.: US 7,991,849 B1
(45) Date of Patent: Aug. 2, 2011

(54) SYSTEM FOR MANAGING CONFIGURATION MEMORY WITH TRANSACTION AND REDUNDANCY SUPPORT IN AN OPTICAL NETWORK ELEMENT

(75) Inventor: Andrei Ponomarenko, Los Gatos, CA (US)

(73) Assignee: Ciena Corporation, Linthicum, MD (US)

( * ) Notice: Subject to any disclaimer, the term of this patent is extended or adjusted under 35 U.S.C. 154(b) by 2810 days.

(21) Appl. No.: 10/066,033

(22) Filed: Jan. 31, 2002

(51) Int. Cl.
G06F 15/167 (2006.01)
G06F 15/16 (2006.01)

(52) U.S. Cl. .................. 709/212; 709/213; 709/217

(58) Field of Classification Search .................. 709/203, 709/220, 227, 223, 212, 213, 217; 707/100
See application file for complete search history.

(56) References Cited

U.S. PATENT DOCUMENTS

| | | | |
|---|---|---|---|
| 5,761,429 A | | 6/1998 | Thompson |
| 5,774,689 A * | | 6/1998 | Curtis et al. ................... 703/21 |
| 5,832,508 A | | 11/1998 | Sherman |
| 6,009,466 A * | | 12/1999 | Axberg et al. ................ 709/220 |
| 6,115,715 A * | | 9/2000 | Traversat et al. ............. 707/100 |
| 6,115,738 A * | | 9/2000 | Yamaguchi et al. .......... 709/213 |
| 6,167,408 A * | | 12/2000 | Cannon et al. ................ 707/203 |
| 6,260,062 B1 * | | 7/2001 | Davis et al. ................... 709/223 |
| 6,467,014 B1 * | | 10/2002 | Bolt ................................ 711/4 |
| 6,519,571 B1 | | 2/2003 | Guheen et al. |
| 6,526,441 B2 * | | 2/2003 | Yamaguchi et al. .......... 709/220 |
| 6,629,081 B1 | | 9/2003 | Cornelius et al. |
| 6,687,698 B1 * | | 2/2004 | Nixon et al. ................... 707/10 |
| 6,760,761 B1 * | | 7/2004 | Sciacca ......................... 709/220 |
| 6,823,386 B1 * | | 11/2004 | Crump et al. ................ 709/227 |
| 6,847,993 B1 * | | 1/2005 | Novaes et al. ................ 709/221 |

* cited by examiner

Primary Examiner — Kristie D Shingles
(74) Attorney, Agent, or Firm — Clements Bernard PLLC; Christopher L. Bernard; Jeffrey M. Measures

(57) ABSTRACT

A system for managing and updating a configuration database for a network element is described. The network element includes several managed objects. The managed objects represent logical representations that can be configured and modified through transactions executed by the network management software. The configuration management system includes a database manager that maintains a database file and a transaction log file. Each managed object includes an object reference key and a storage location pointer. Logical dependencies among objects are maintained through the linking of storage location pointers in the objects. Actions that modify an object are stored in the database file and the transaction log file. The present state of an object is stored by the database management system. In the event of an abort condition, the most recent configuration state of the network element is restored by re-applying the transactions stored in the transaction log file, and resolving the pointer links contained in the affected managed objects.

21 Claims, 16 Drawing Sheets

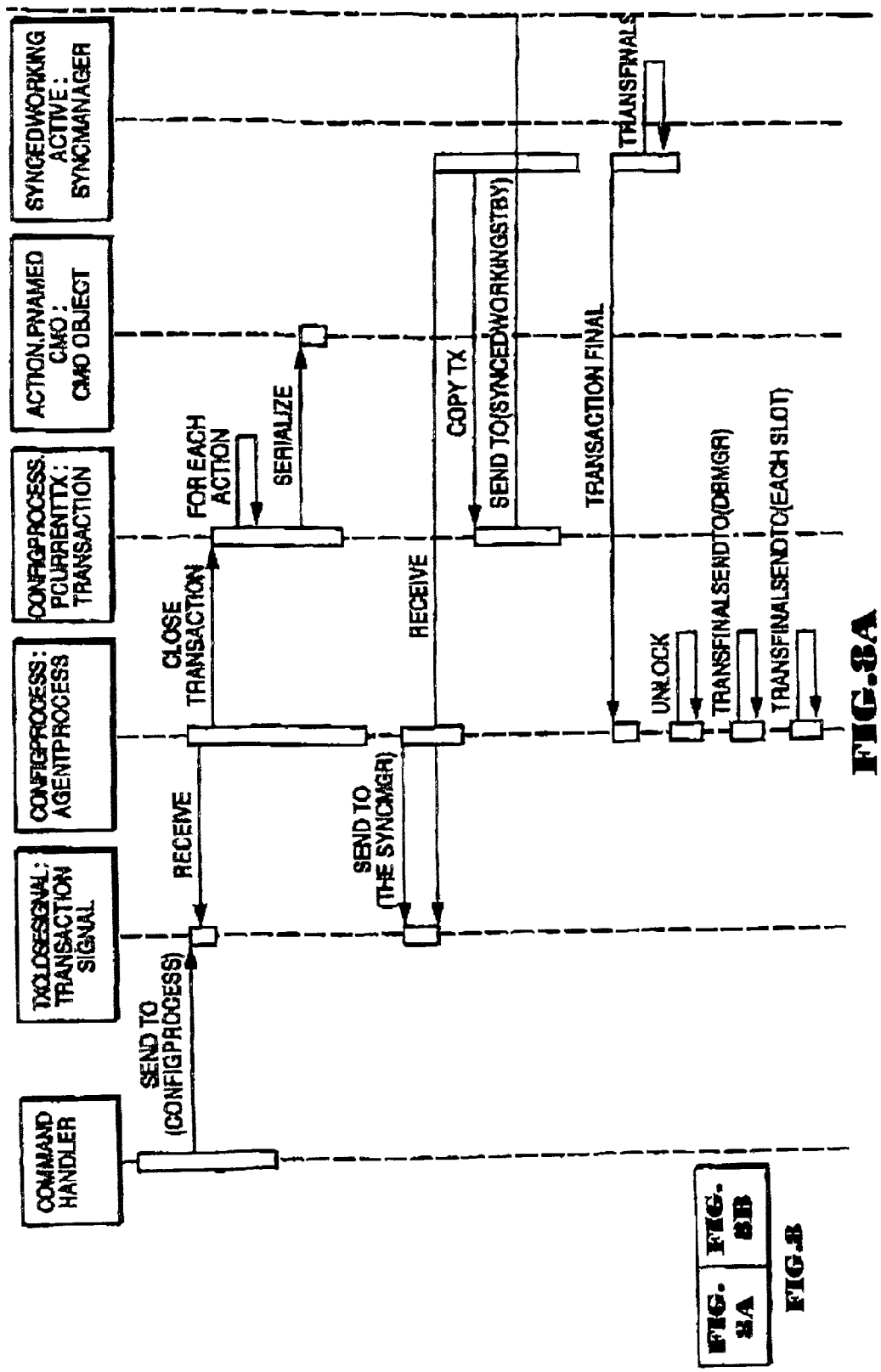

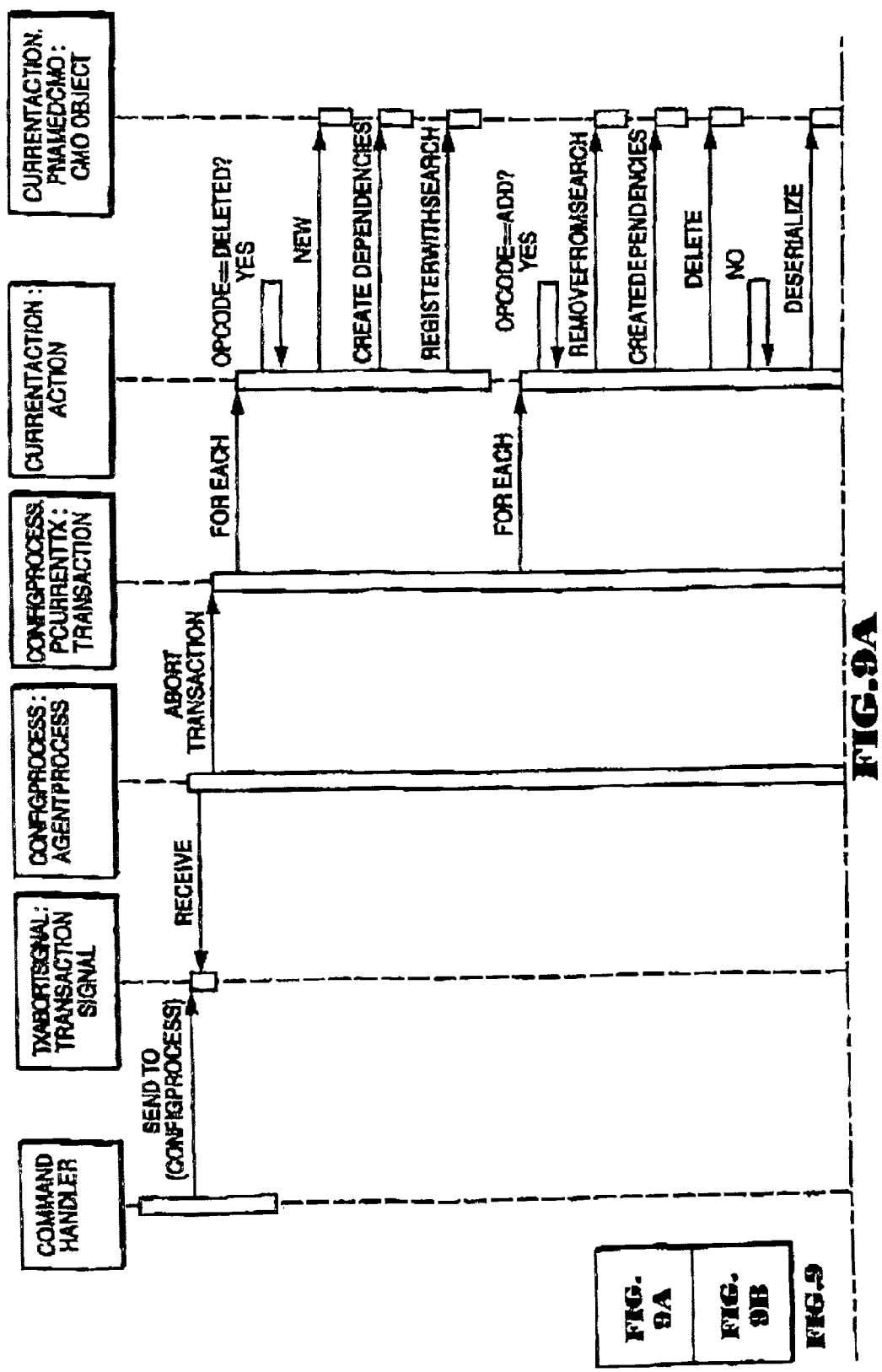

SYSTEM FOR MANAGING CONFIGURATION MEMORY WITH TRANSACTION AND REDUNDANCY SUPPORT IN AN OPTICAL NETWORK ELEMENT

CROSS REFERENCE TO RELATED APPLICATION

The present application is related to the following co-pending U.S. patent application: U.S. patent application entitled, "System for Managing Configuration Data with Persistence and Synchronization in an Optical Network", having application Ser. No. 10/062,594, and filed on Jan. 31, 2002, and which is assigned to the assignee of the present application.

FIELD OF THE INVENTION

The present invention relates generally to communication networks, and more specifically to a system for updating and maintaining memory configuration databases across a network.

BACKGROUND OF THE INVENTION

Large computer networks, such as Wide Area Networks (WAN) or Internet backbone systems often incorporate various types of network devices (nodes) and network protocols. For example, for Synchronous Optical Network (SONET) systems, most communication between transport nodes uses the OSI (Open System Interconnection) over the DCC routing protocol to establish and route traffic between two nodes.

The OSI environment includes data communication protocols to manage data movement among network nodes and uses application-oriented protocols to ensure that once the data is transferred, it can be understood and processed by an application process. Under the OSI model, functionally similar protocols are grouped into seven layers. These layers are: the physical layer, data link layer, network layer, transport layer, session layer, presentation layer, and application layer, with each layer providing services to the layer above it. The physical, link, and network layers are network dependent and use data communication protocols to control communication between two network nodes. The application, presentation, and session layers are application oriented and use protocols that let end user application interact using services offered by each node's local operating system. The transport layer uses services provided by the network dependent lower layers to provide the application oriented layers with a messaging service that is independent of the network.

The operating system software or application software that manages communication must be able to identify and manage the various entities that comprise the network elements, such as the network nodes and links. Typically, the network entities are represented as software objects that are managed and processed by the system software. A database is often used to list the various objects within a network. For example a control card within a node can be represented as an object for processing by the system software. For proper processing of network communications, objects must be properly identified and links among the various network objects must be maintained. Present network management software, however, generally does not feature adequate object management processes to allow the comprehensive management of network entities in an efficient manner. Oftentimes, complex code must be provided to synchronize tasks among various network objects. For example, using typical object-oriented language techniques, objects are managed by looking up every object in the system using a map or keyword system. This creates significant programming and processing overhead.

Another disadvantage associated with typical network management software is the lack of efficient persistency support. Practical networks are often subject to various exception and failure conditions. For example, a node or link may fail, causing a section of the network, or the entire network to be taken down. Recovery from such a failure often requires restoring a network to its condition prior to the failure. If such failure recovery is not performed in an efficient manner, significant amounts of transmitted data may be lost.

SUMMARY AND OBJECTS OF THE INVENTION

It is an object of embodiments of the present invention to provide comprehensive transaction support for objects within the network.

It is another object of embodiments of the present invention to provide efficient synchronization of configuration data within a network.

It is a further object of embodiments of the present invention to provide persistency support for managed objects within a network.

A system for managing and updating a configuration database for a computer network is described. The network comprises several network elements, such as controller cards and the like, that include managed objects. The managed objects represent logical representations of network entities that can be configured and modified through transactions executed by the network management software. The configuration management system includes a database manager that maintains a database file and a transaction log file. Each managed object includes an object reference key and a storage location pointer. Logical dependencies among objects are maintained through the linking of storage location pointers in the objects. Actions that modify an object are stored in the database file and the transaction log file. The present state of an object is stored by the database management system. In the event of an abort condition, the most recent configuration state of the network is restored by re-applying the transactions stored in the transaction log file, and resolving the pointer links contained in the affected managed objects.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicates similar elements, and in which.

DETAILED DESCRIPTION OF THE INVENTION

A system for managing network objects in a database is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Embodiments of the address mapping system of the present invention can be used with various types of network protocols and systems. These networks can be copper or fiber based systems that implement various network protocols such as Internet Protocol (IP), and the like. In an exemplary embodiment, the object management database system is implemented in a SONET (Synchronous Optical Network) based fiber optic network.

Figure 1:
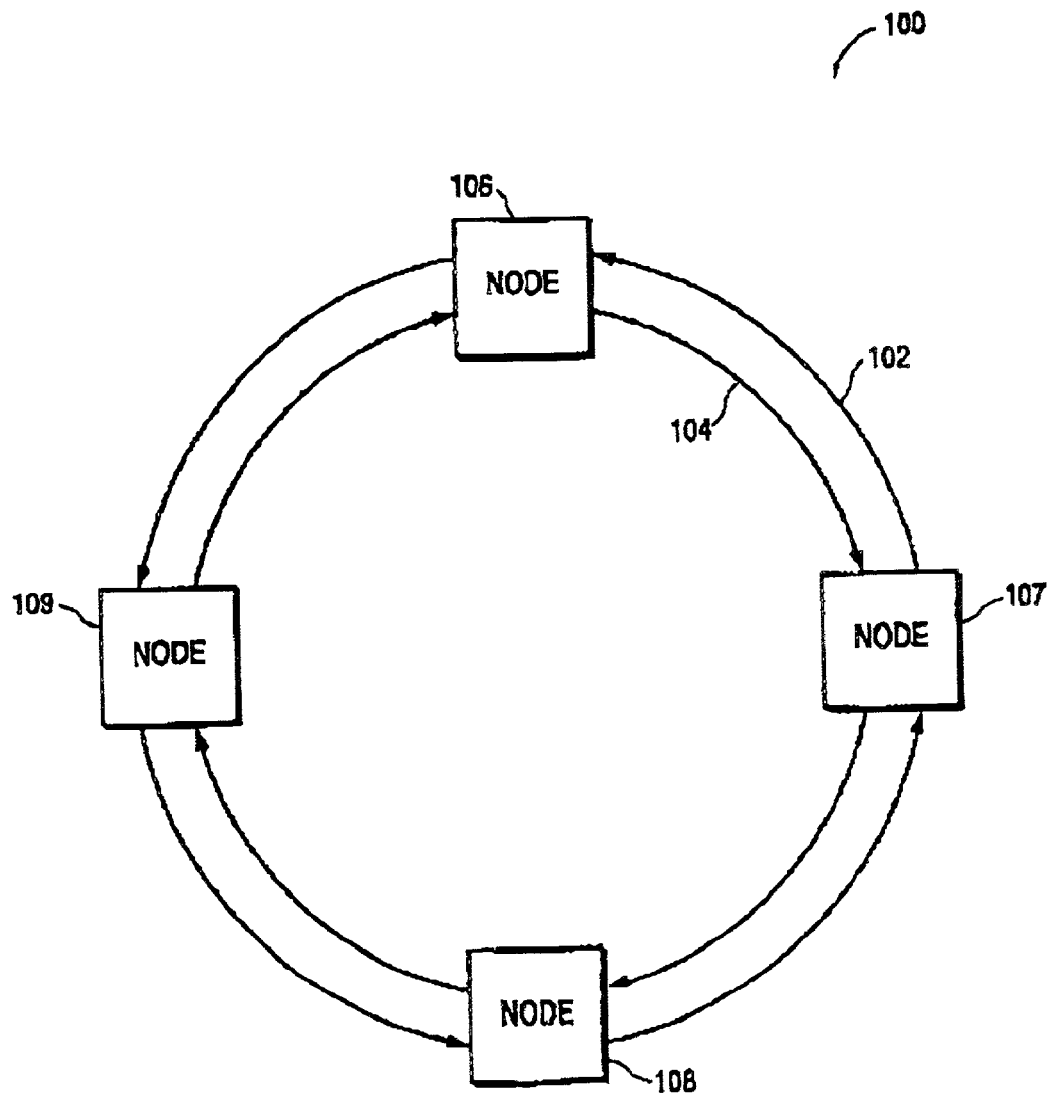
FIG. 1 is an architectural diagram of a data communication network incorporating a SONET ring that implements a configuration database management system, according to one embodiment of the present invention.

Embodiments of the present invention are intended to be used with SONET based fiber optic networks. SONET networks use two transmission paths between network nodes in a ring configuration. FIG. 1 is an architectural diagram of a SONET ring that implements a configuration database management system, according to one embodiment of the present invention. The SONET network 100 includes nodes 106 through 109 coupled through fiber paths 102 and 104. Each node represents a network element that is typically implemented as, or includes, a digital cross-connect system (DCS) or add-drop multiplexor (ADM). The type of device embodied by the nodes 106-109 depends upon the network environment and application in which the SONET ring is used. An add-drop multiplexor is a network device typically used by telecom carriers to switch and multiplex low-speed voice and data signals onto high-speed lines. These types of nodes are widely used with central office telephone switches and are typically used to aggregate several T1 lines into a higher speed electrical or optical line. A digital cross-connect is used to switch traffic between multiple SONET links, and serves to link high-speed lines to other high-speed lines.

The ring that connects the nodes 106-109 together in a SONET network is typically a bi-directional counter-rotating ring. This architecture facilitates the implementation of various protection measures. Any network is susceptible to various types of failures, at least to some degree. Such failures may include node failures, corrupted signals, damaged network lines, and other such failures. To minimize the risk of overall network collapse due to such a problem, a SONET ring includes two or more counter-rotating rings. One ring 104 is referred to as the "working" ring or fiber path and the other ring 102 is referred to as the "standby" or protection ring or fiber path. The working ring typically rotates clockwise and the standby ring rotates counter-clockwise around the network, however the actual directions of rotation for these rings may vary depending upon conventions adopted by the equipment manufacturers. The working ring 104 transmits data between the nodes 106-109. In Uni-Directional Path Switched Ring (UPSR) protected systems, when a failure occurs, the standby ring 102 acts as a backup channel to and carries the bandwidth of the working ring for the network 100. In this manner, a failed node or link section can be bypassed using the appropriate bandwidth capacities of the working and standby rings. FIG. 1 illustrates a simple UPSR SONET ring topology comprising a two fiber unidirectional network. In this network, all data is transmitted using the bandwidth of the working path while the standby path is idle. When a failure in the working path occurs, the bandwidth of the standby path is utilized to transmit data.

A common implementation of a SONET network is the four fiber bi-directional network in which two separate fiber paths comprise the working ring, and two other separate fiber paths comprise the standby ring. For this topography, one working ring rotates clockwise, and the other rotates counterclockwise. Their respective standby rings rotate in opposite directions to form two separate counter rotating rings through each of the nodes. This type of system is quite robust, and is typically used in large carrier networks that must be well protected against a breakdown.

Other SONET network topographies, such as two fiber bi-directional, or four fiber unidirectional networks are also possible, and can be used in conjunction with embodiments of the present invention.

As illustrated in FIG. 1, a SONET network generally uses two or four transmission paths between network nodes in a ring configuration and includes a number of network elements (nodes) coupled through fiber paths. Some network elements can be implemented as digital cross-connect systems (DCS) or add-drop multiplexors (ADM) elements. The actual type of device embodied by the network elements depends upon the network environment and application in which the SONET ring is used. The hardware system used to implement the node is typically embodied within a network computer card, typically referred to as a "control card". The cards that provide the hardware embodiment of the network nodes typically represent logical entities or objects within the network system. Each control card contains memory that stores configuration data pertaining to that card. The configuration data is a collection of objects. An overall system-level program is generally used to control traffic over the network. Such a program typically monitors and maintains the status of all of the nodes (elements) on the network, handles path switching for failed nodes, and helps the network recover from any failures. Typically the system software includes a configuration database stored in the memory of one or more nodes that stores the identity and operating parameters for each of the network elements. The system that manages the configuration database and the transactions affecting this database according to embodiments of the present invention is referred to hereinafter as the "configuration memory (or database) management system" or the "managed object database system."

In many current systems, the network uses OSI protocols. Network elements in a communications system are generally represented as logical entities. Each network element must have a unique identifier or address that enables it to be properly accessed by the protocols within the seven-layer OSI model. Each element is typically represented as an object for processing by the system software or network management software. Embodiments of the present invention are directed to a configuration management system that maintains a database of the managed objects within a database and facilitates transactions among objects within the system.

Figure 2A:
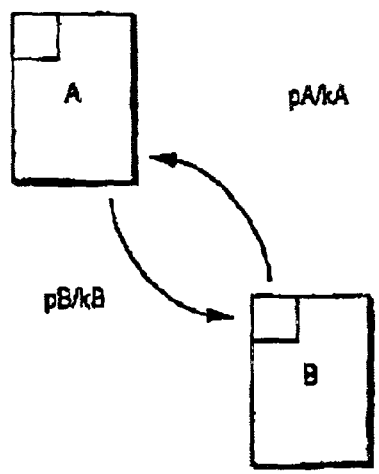
FIG. 2A illustrates two managed objects, each containing object references, according to one embodiment of the present invention.

In one embodiment of the present invention, the configuration management system is implemented in an object-oriented programming language, such as C++ or a similar programming language. FIG. 2A illustrates two objects A and B. Throughout the description and figures, the objects processed by the configuration management system may be referred to as "managed objects" (MO or CMO). Each managed object has a unique key and is addressed by other objects through a pointer. Each managed object could represent a set of attributes with some functionality attached to it. For example, an object could comprise one channel of an OC-48 card in a SONET network. There could be different provisioning attributes or operational states associated with this channel, as well as network connection information for that channel. Each object that can be provisioned by a user includes an object reference. Some classes of objects, such as service objects, may not have a reference, but generally all objects have object references. The object reference is basically a key for each object that contains certain attributes related to the object, such as, port, slot, and so on.

Figure 2B:
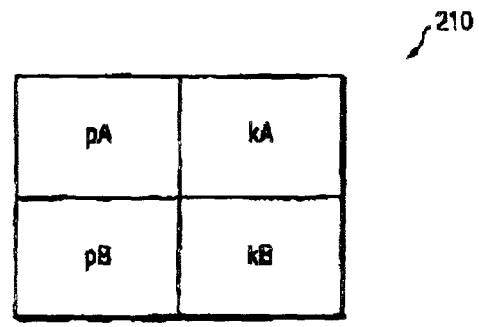
FIG. 2B illustrates a map of object references for the two exemplary objects illustrated in FIG. 2A, according to one embodiment of the present invention.

As illustrated in FIG. 2A, object A accesses object B by a pointer/key combination, pA/kA; and object B accesses object A by a pointer/key combination, pB/kB. The object references for each object are maintained in a map. FIG. 2B illustrates a map of object references for the two exemplary objects illustrated in FIG. 2A, according to one embodiment of the present invention. The pointer and key (object reference) information for each managed object is maintained in a map that is maintained and accessible to the configuration management system. FIG. 2B illustrates a map 210 that includes the pointer and key pair for object A and the pointer and key pair for object B of FIG. 2A. The pointer for an object is the memory location where the object is stored, and the key is the object reference. This allows accessing of objects through direct links through other objects. In this manner, individual look-ups are not required for each separate object.

Embodiments of the present invention include mechanisms for the persistent storage of the managed objects. Storage is typically performed by the use of a database maintained by operating system software responsible for managing network communication. Various database-specific operations, such as database downloads, and synchronization are not described, but can be implemented using techniques familiar to those of ordinary skill in the art. The managed object database system includes external interfaces, which allow the managed objects to be saved in non-volatile memory and reflect the internal design of the saving mechanism. Mechanisms for auto-recovery, end of transaction, and rollback procedures are also included.

Configuration Database Transaction Support and Redundancy Support

Network communication typically involves many transactions between network elements. Such transactions typically comprise several actions that affect various objects in the network. In relation to the configuration management system, transactions are a group of logically connected updates of the data storage in memory. In general, all updates are done in the scope of a transaction. The main features of transaction support system are to provide a means for restoring memory to the exact state it was in prior to the transaction, if the transaction is aborted; capture the changes to objects and supply these changes to a CPU redundancy support module (synchronization manager); and provide the changes to a persistence support module (database manager). In normal transactions, multiple messages update a number of objects. The transaction support feature allows the configuration of the system to be restored using a single logical update in the event that a command or object fails.

Figure 3:
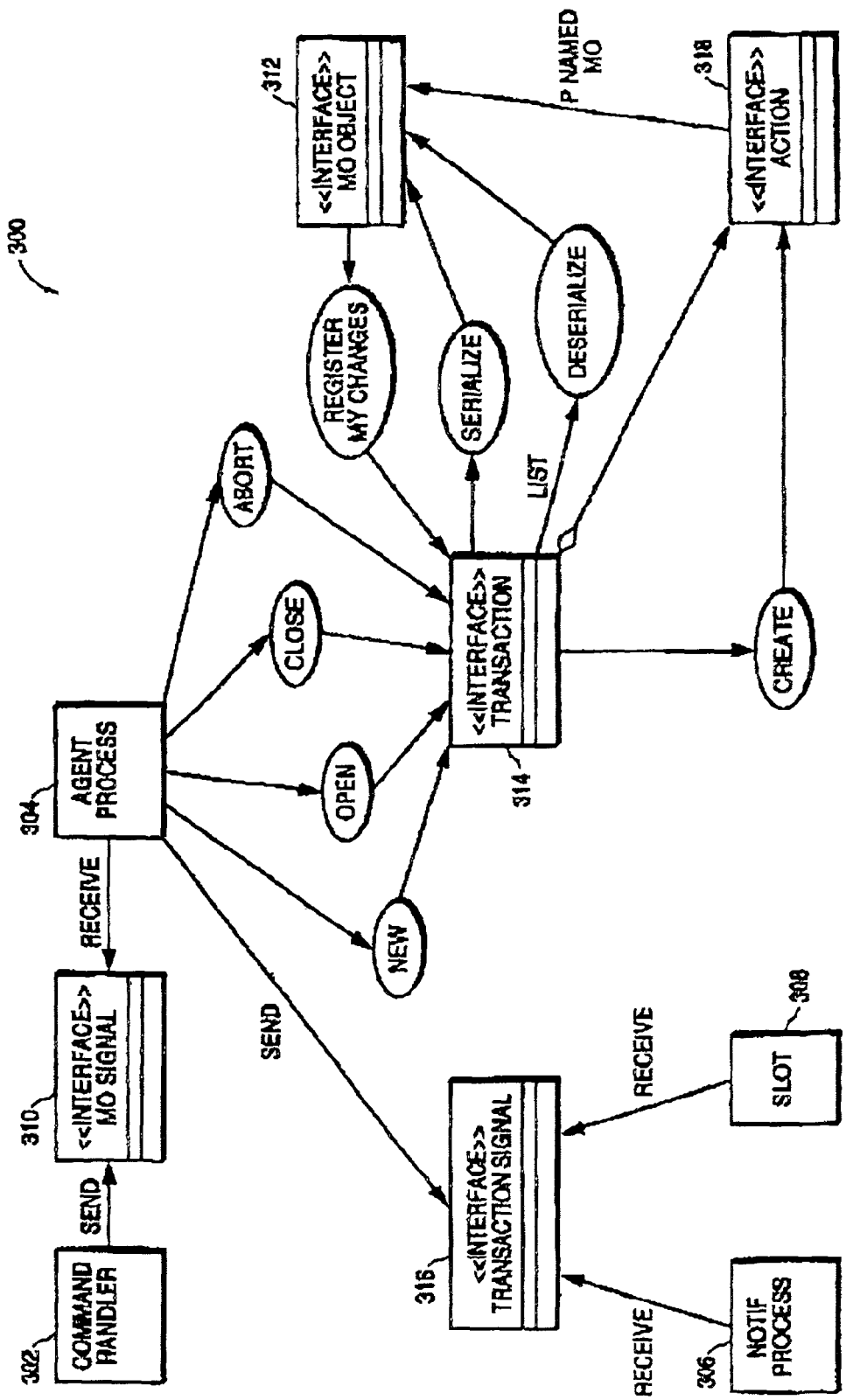
FIG. 3 is a flow diagram that illustrates the generic data flow and service classes for the managed object database system, according to one embodiment of the present invention.

FIG. 3 is a flow diagram that illustrates the generic data flow and service classes for the managed object database system, according to one embodiment of the present invention. The system 300 illustrated in FIG. 3 includes processes such as command handler 302, agent process 304, notification process 306, and slot process 308. The processes act on managed objects 312 through various interfaces. The interfaces in system 300 include a managed object signal interface 310, a managed object interface 312, a transaction interface 314, a transaction signal interface 316, and an action interface 318. These interfaces perform various tasks on the objects, such as creating new processes, opening or closing existing processes, aborting operations, registering object changes, serializing or deserializing objects, and creating new actions, among other functions.

The transaction support system 300 maintains the locking semaphores and list of transaction objects and manages access rights to the managed objects. Each transaction object contains the list of action objects, that contains all of the information about a single change for a single managed object, such as a pointer to an object, an operation code (e.g., modify, delete, etc). Transactions also contain a transaction ID tag, transaction state variable (open, closed), identification of whether the transaction is to be saved in persistent storage or not, and a pointer to the process that started it.

Figure 2C:
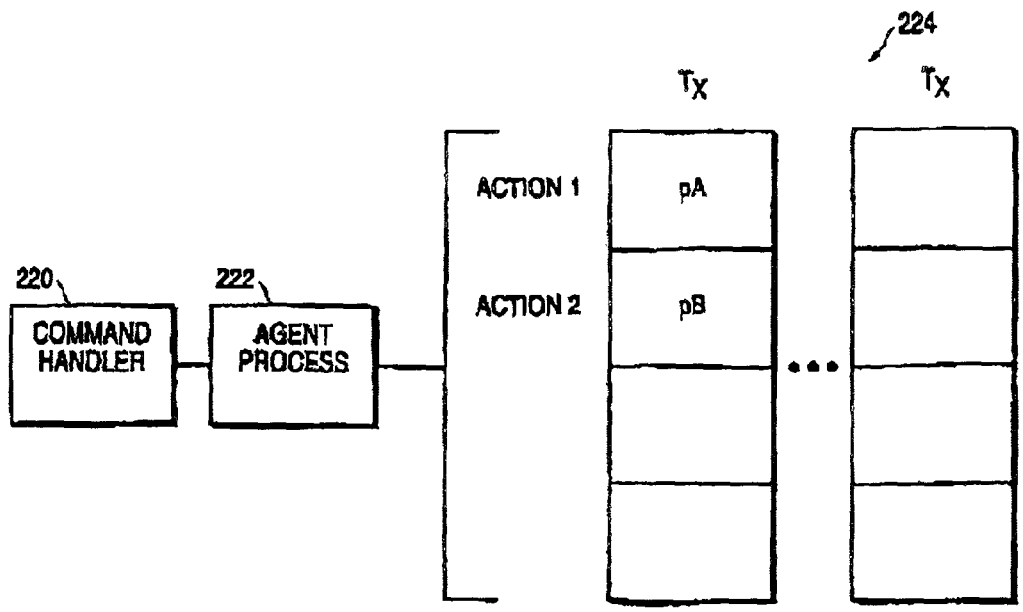
FIG. 2C illustrates the interface between an agent process and one or more transactions, according to one embodiment of the present invention.

As illustrated in FIG. 2C, the agent process 222 receives messages from the command handler 220, which is a link to the user, and works with a collection of objects. Each agent process supports a certain function, such as open transaction, close transaction, abort transaction, and so on. The transaction interface is a set of transactions 224, and each transaction consists of multiple actions. One action can be an update of a single object, such as Action 1 in FIG. 2C. The agent process can access an open transaction or it may open a new transaction if the appropriate transaction is not already open. Once a transaction is open, all affected objects will register its contents with the transaction support system. Once an object is registered, a new action is created, and this is initiated by the agent process opening a transaction.

Figure 4:
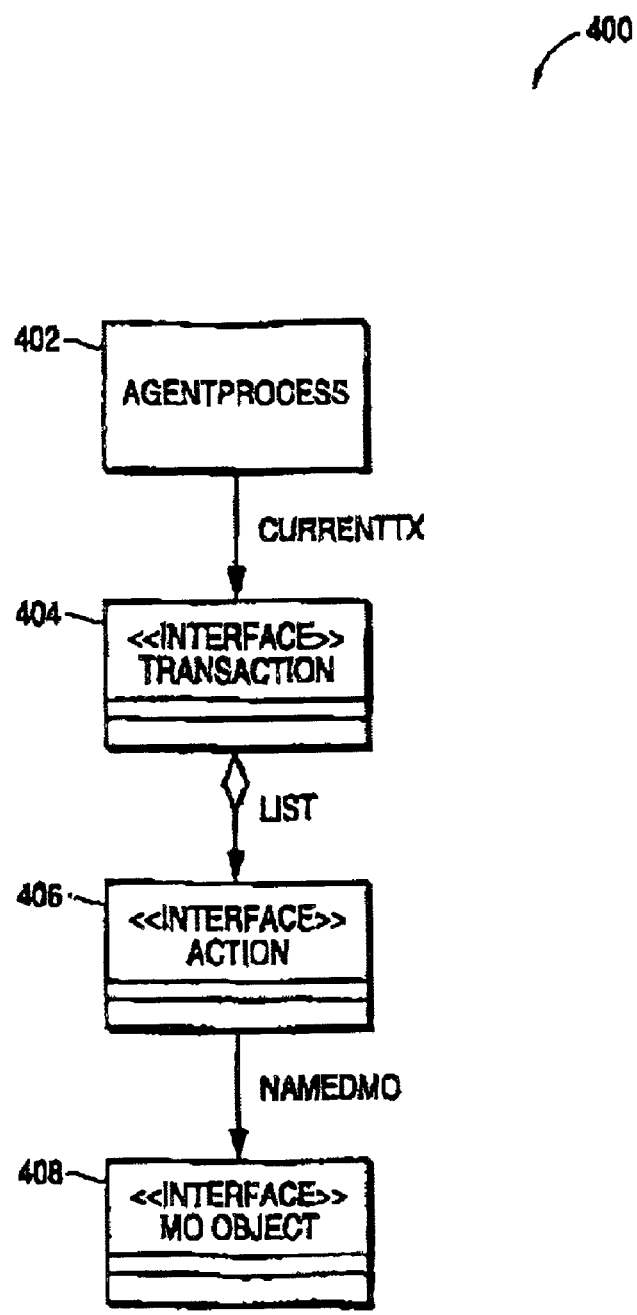
FIG. 4 illustrates an object transaction containment diagram, according to one embodiment of the present invention.

FIG. 4 illustrates a transaction containment flow diagram, according to one embodiment of the present invention. An agent process 402 opens a transaction through transaction interface 404. The transaction interface 404 accesses a list of actions in action interface 406. The action list corresponds to the actions contained in a current transaction. The action list acts on one or more managed objects through a managed object interface 408. In one embodiment, agent processes 402 represent system level software processes, such as a configuration manager, alarm manager, automatic protection switching manager, and so on. Such processes typically provide monitoring and configuration functions for a wide variety of entities and objects within a network.

Figure 5:
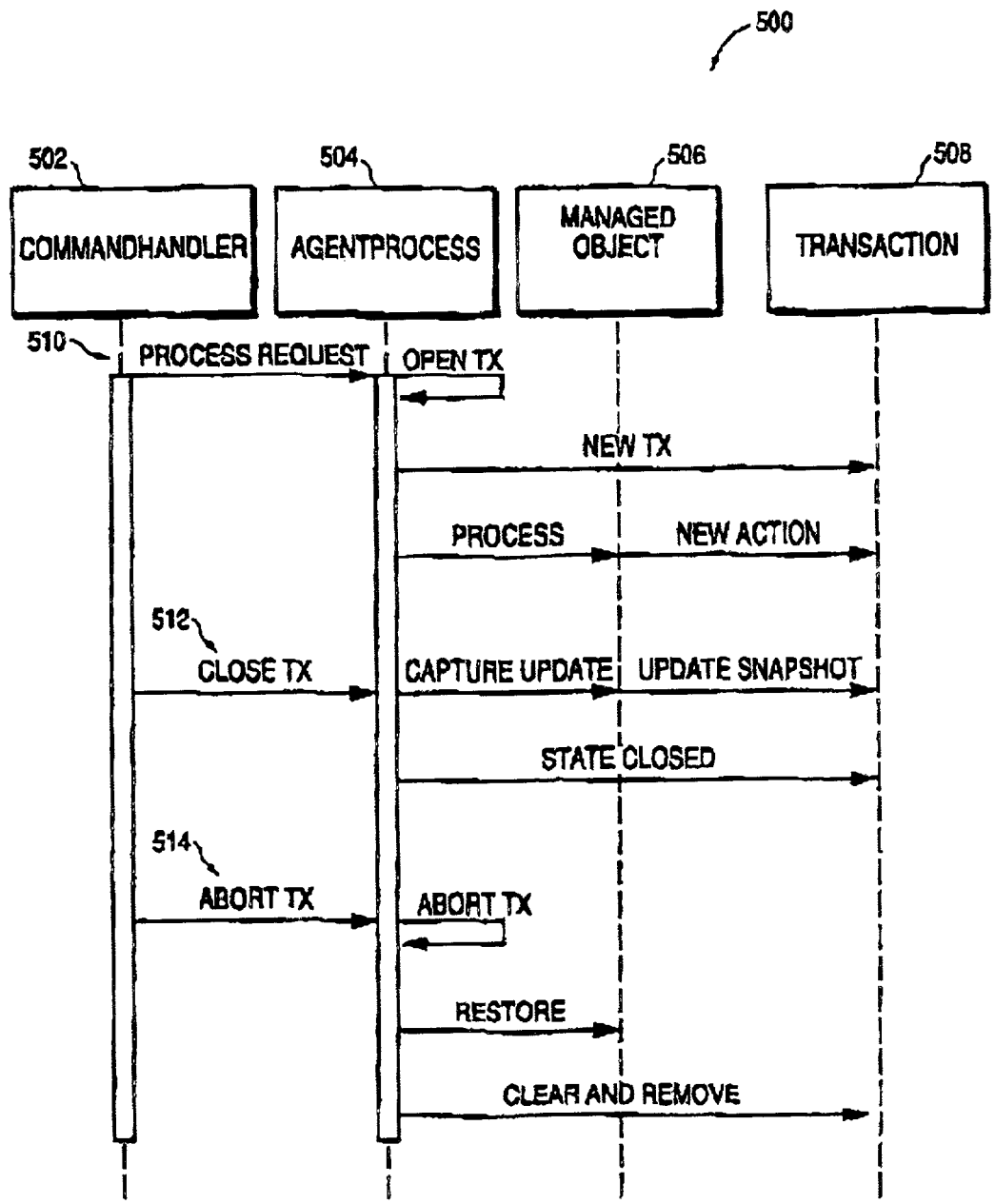
FIG. 5 illustrates an overall sequence for the transaction support system, according to one embodiment of the present invention.

FIG. 5 illustrates an overall sequence for the transaction support system of the configuration management system, according to one embodiment of the present invention. Diagram 500 illustrates the interaction of the command handler 502, agent process 504, managed object 506, and transaction 508 for three major types of transactions, the opening of a new transaction, the closing of a transaction, and the aborting of a transaction. The command handler 502 first sends a process request to the agent process 504. The agent process 504 then opens a transaction (Tx). If the transaction does not exist, a new transaction (storage location) is created. The process requested by the command handler 502 will impact certain managed objects 506, such as through a modification, addition, or deletion of an object. This will create a new action to be created for the transaction 508. If an object is already registered, it does not become registered a second time. Diagram 500 only illustrates a single process, action, and transaction, however multiple transactions and managed objects can be created for one or more agent processes.

Using the sequence illustrated in FIG. 5, a command operating on an object is first passed from the command handler to the agent process. A new transaction or existing transaction is opened. The nature of the command contains the nature of the state change to be performed on the object. The targeted object is identified using the map. The state change is then transmitted to the targeted object. The transaction is then registered, and the pointer on the object is saved. The original contents of the object is also saved, and this provides the basis for the rollback operations in the event of abort processes.

The close transaction process 512 is initiated by the command handler 502 when it is finished sending messages. In general, only the command handler 502 issues close transaction commands since it alone knows when no more messages are to be sent. The agent process 504 then initiates a close sequence by executing its own close transaction function. When the close command is processed a present state snapshot of the object after the state change is saved. The updated snapshot may overwrite the old snapshot so that only the most present state of the managed object is saved.

If an abort operation 514 occurs, the previous states of the managed objects are restored using the stored snapshots of the managed objects. This puts the objects back into the state they were in prior to the abort sequence. If the object has been modified, the snapshot data is applied to the object so that the saved contents are stored back for that object. If the object has been deleted, the object is restored, and if the object has been created, the object is removed from map. Abort sequences may be initiated by managed objects themselves, such as when an object determines that it cannot perform a requested operation. If an object denies an operation, the denial is registered to the command handler. The command handler then initiates an abort procedure that is transmitted to the agent process that executes a static function of the transaction. This functions iterates through every transaction on the list and looks up the operation code and title of the object and reverses the operation performed on the modified objects for every single action.

In one embodiment, direct pointers to the objects are used in storing the state of the objects. In general, the present state snapshots of the managed objects are stored in a to buffer included in or coupled to the network element. The storage of this buffer allows a persistent support feature of the managed object database. This buffer may also be stored on other network elements, so that the present state of the objects is replicated in more than one location. This provides redundancy support of the managed object database. In transaction support, accommodation must be made when an object is moved, since direct pointers are used.

Figure 6:
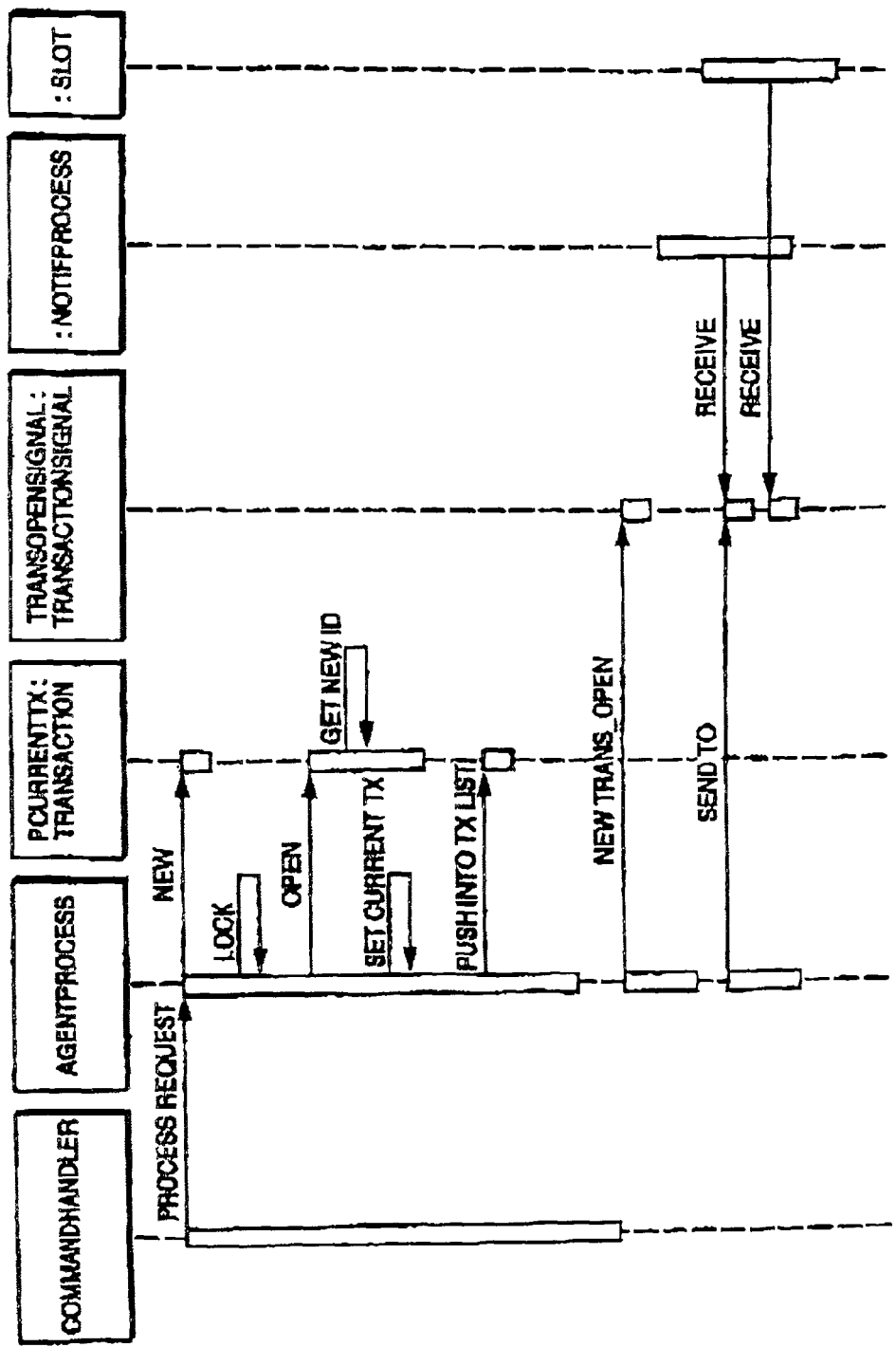
FIG. 6 illustrates a transaction opening sequence, according to one embodiment of the present invention.

FIG. 6 illustrates a transaction opening sequence in greater detail, according to one embodiment of the present invention. The command handler sends a command to the agent process through a process request. A new transaction is created when an agent process invokes an open transaction command. A current transaction is created by the opening of a transaction or the creation of a new transaction. Once a transaction is opened, any signal that is sent by the command handler is applied to the managed object in the scope of the opened transaction. All changes to the managed object are captured.

Figure 7:
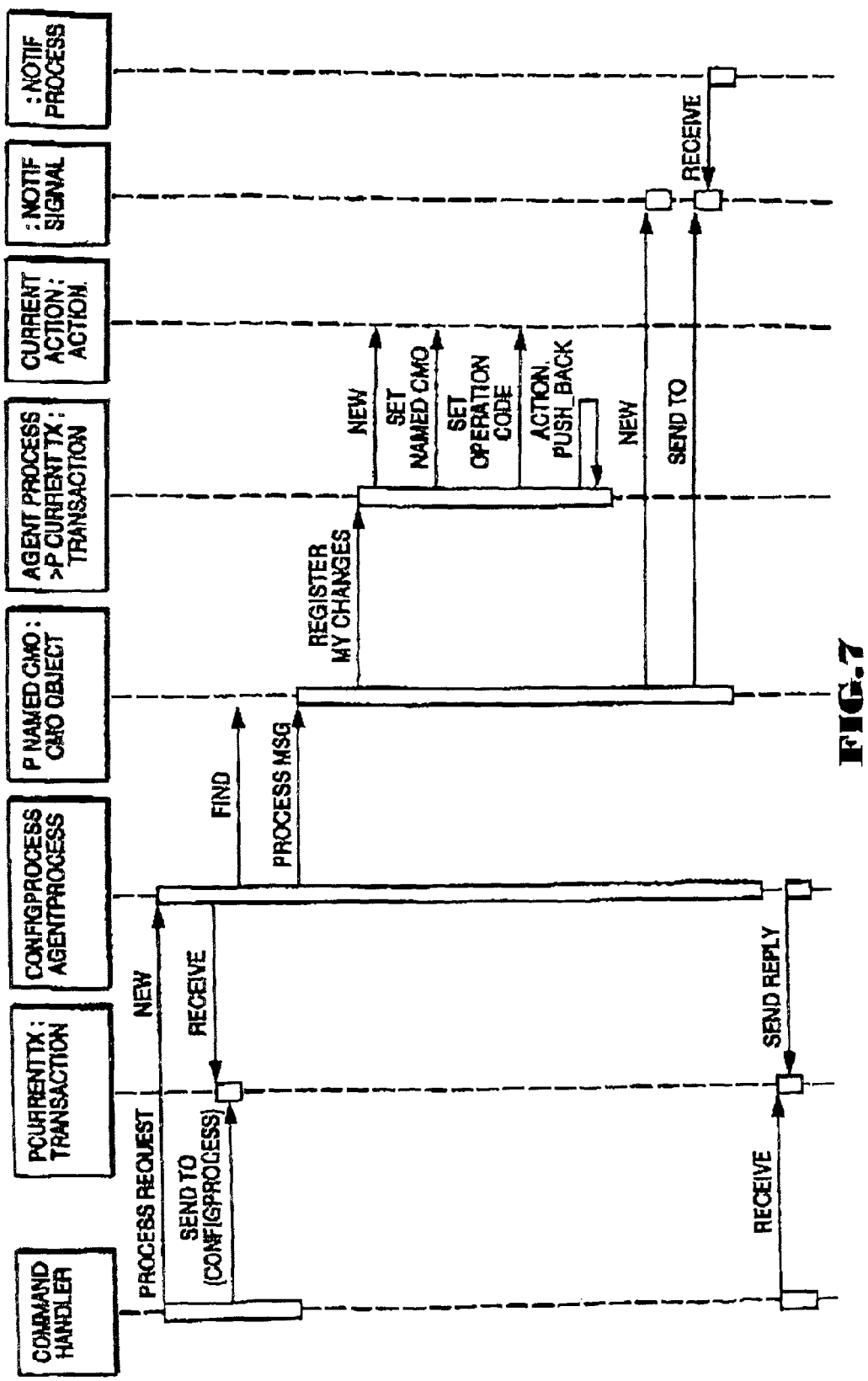
FIG. 7 illustrates a managed object update and change registration sequence, according to one embodiment of the present invention.

FIG. 7 illustrates a managed object update and change registration sequence, according to one embodiment of the present invention. Any changes to a managed object from the command handler are processed through the agent process to the named managed object. The changes are registered and the current action specified by the operation code is executed.

Figure 8B:
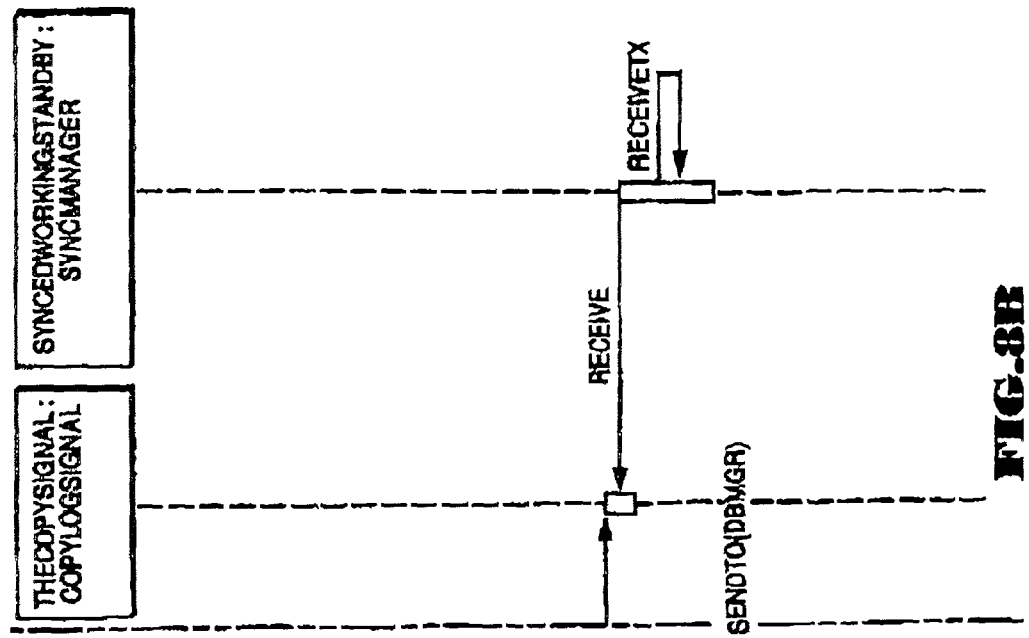
FIG. 8 illustrates a transaction closing sequence, according to one embodiment of the present invention.

A transaction is closed when the process that started it calls the close transaction command. FIG. 8 illustrates a transaction closing sequence, according to one embodiment of the present invention. Upon the closing of a transaction, present state "snapshots" of the modified objects are taken and saved in an action buffer. The agent to process informs a separate process called a synchronization (sync) manager that the transaction is closed and passes the transaction ID for the closed transaction. The sync manager splits the transaction contents into groups of raw data and transmits it via special "copy" signals to a second network element. In one embodiment, the second element may be a protection or standby CPU in a second parallel network, such as the standby ring of a SONET network. The sync manager of the second network element receives these messages and restores the original transaction in the memory of second network element. A remote side sync manager then rolls this transaction forward by applying the changes to the configuration memory database residing in the memory of the second network element. The functionality of the sync manager is described in further detail below with reference to the synchronization feature of the configuration management system.

After processing, the sync manager sends a signal with the same transaction ID to the database manager. If the transaction is to be stored, the database manager saves it to the database file. In any case, the database manager cleans the transaction and removes it from the transactions list. In the event that any of the update signals could not be processed, a "deny" reply is sent to the process that started the transaction. As a result of this denied request, this process will issue an abort transaction signal.

Figure 9B:
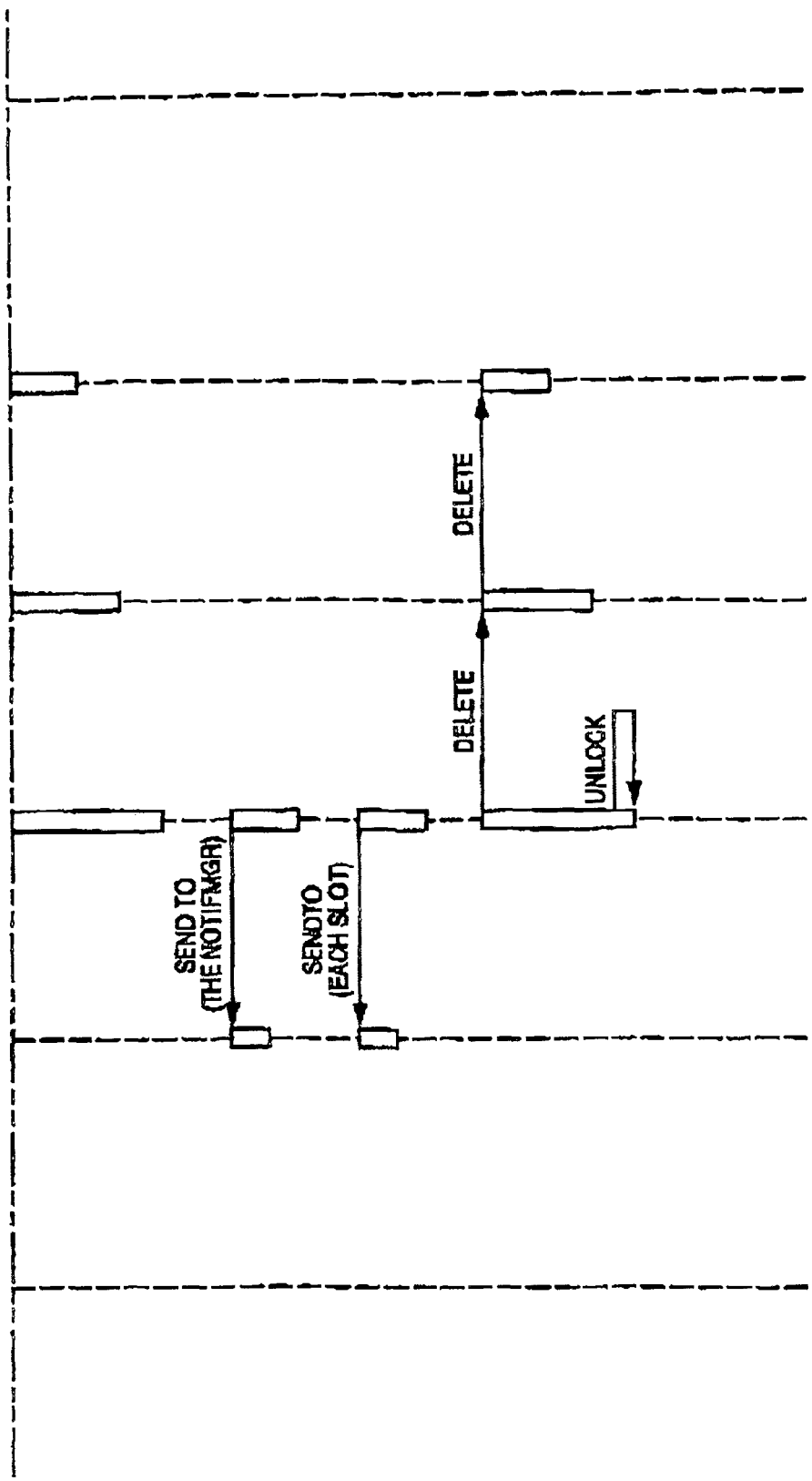
FIG. 9 illustrates a transaction abort sequence, according to one embodiment of the present invention.

FIG. 9 illustrates a transaction abort sequence, according to one embodiment of the present invention.

Managed Object Database System Functionality

The managed object database system includes a database manager that consists of several modules, including a loader module, a rollback (recovery) module, and a transaction saving module. Each transaction involving a managed object is prepared outside of the database system an agent process. The loader is used to load the managed objects in the memory at booting time. The configuration database consists of two modules: the managed objects themselves, and a managed objects map. The managed objects map is not saved in the non-volatile memory. The loader reconstructs the managed objects map at every instance of boot up.

Figure 10:
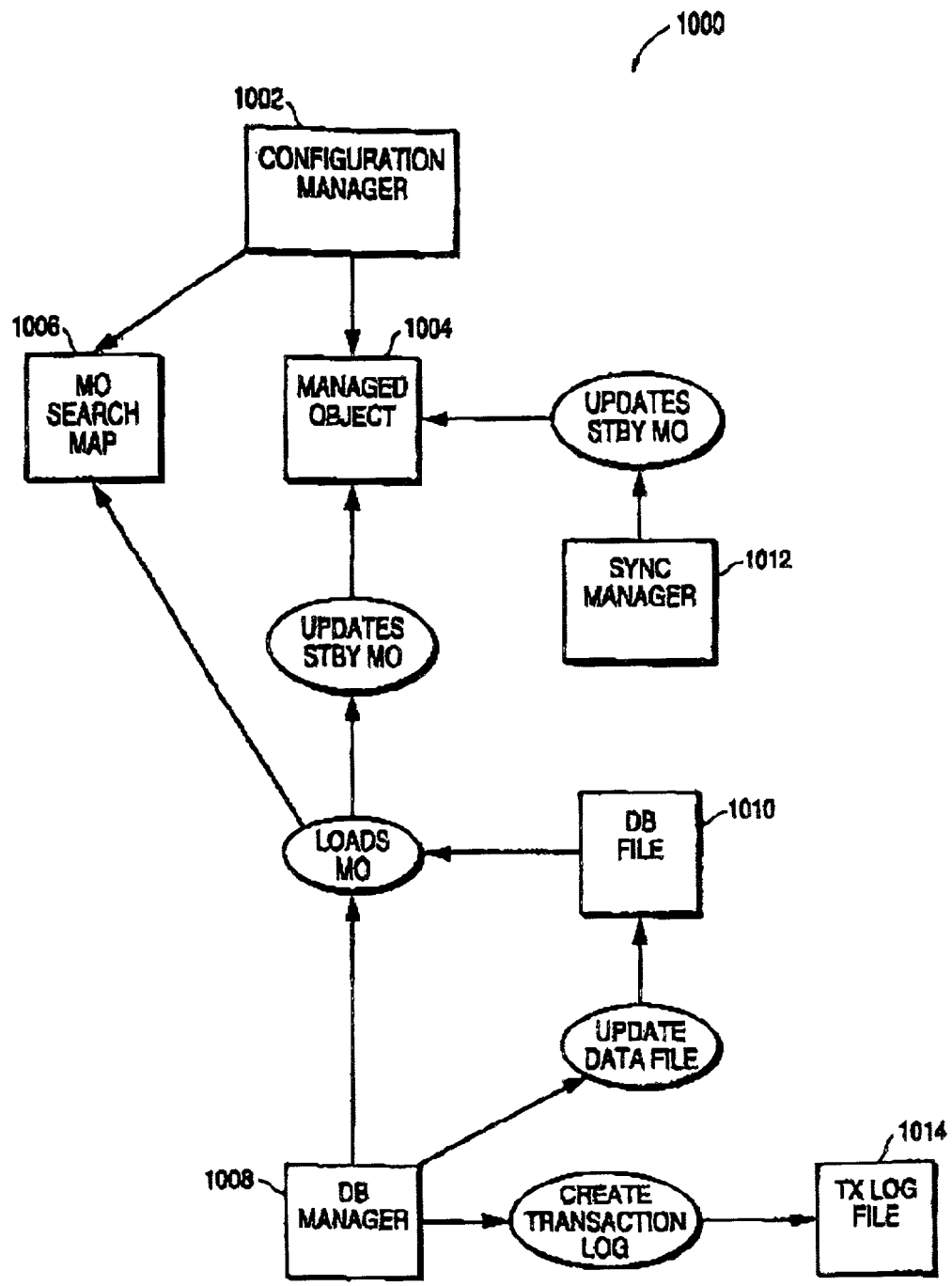
FIG. 10 is a block diagram of the modules within the persistence support process of the managed object database system, according to one embodiment of the present invention.

FIG. 10 is a block diagram of the modules within the persistence support process of the managed object database system, according to one embodiment of the present invention. The configuration manager 1002 manages the managed objects 1004 and maintains a managed object search map 1006. A database manager 1008 loads the managed objects and updates a data file. The data file is managed by a database file, which contains the entire managed objects database. The database manager 1008 also creates transaction logs that are stored in a transaction log file 1014. A sync manager process 1012 updates standby managed objects.

To provide the connection between the persistent managed objects and memory, additional attributes and functionality are introduced to named managed object and managed object base classes. These attributes include support for dirty bits and attributes to store file position and size of the object on file. Every managed object derives from these two classes and can thus access this functionality and attributes.

To provide a further link between managed objects and persistent storage, the system needs to track changes and register them with the current transaction. This functionality is encapsulated in agent process transaction processing sequences. The database manager 1008 receives a signal from an outside entity or another process, such as sync manager 1012, which contains an ID of transaction that needs to be saved. The database manager then saves current updates to the transaction log file 1013 in preparation for a possible rollback, and saves updates to the data file.

Locating an object in the database file 1010 is possible because every managed object contains a field that stores the offset in the file. Each record for an update consists of a header and the contents of the modified object. The header contains the address and the operation type for the action performed on the object. The transaction log file 1014 maintains a snapshot of the last transaction and exists only while a transaction is still pending and has not yet finished. The transaction log file is typically only used in the event of sudden power failure. The database manager 1008 supports recovery operations to provide database consistency in case of power failure or other interruption event, while working with persistent storage. This is achieved by using the transaction log file 1014.

The loader module works during the initial boot sequence and creates managed objects and a managed object map in the memory. The data file is scanned twice during this operation. During the first scan, identifiers (managed object references) are read and memory is allocated according to the object type. The managed object reference and pointer pair for the allocated memory associated with a managed object creates a unit of the search map. No attributes or connections are set during this pass. The attribute values are set during the second pass. The search map is used to fill out the connections among various managed objects by using attributes representing associations between objects. Since connections are stored as identifiers (object references) instead of pointers, a reverse conversation is taking place. Managed object references are converted to pointers using the map built during the first pass. When scanning the file, a free space to list is constructed in the managed object database. The free space list is a list that maintains file spaces available for writing.

The recovery, or rollback module is an important element of the managed object database system as it facilitates reversion of the system to a state just prior to an interrupt or failure state. Before loading of the database in memory upon booting, the database is analyzed to see if a transaction log file 1014 exists. Such a log exists if all transaction content is logged. The fact that it exists suggests that a failure or interrupt event occurred, such as a power failure or operating system crash, while the log file was created. This is due to the fact that according that every transaction log is removed after a transaction is completely processed by the database manager 1008. If all transaction content is in the transaction log file 1014, then the failure happened while updating the data file. In this case, the recovery module is needed to restore the state of the memory.

The configuration memory state is restored by rolling the transaction log forward. This operation is identical to saving transaction results to the database file 1010, except that the transaction is read from the transaction log file 1014 and not from the memory location (transaction list). In case of power failure, the transaction list is unavailable.

If the transaction log file 1014 does not contain any information, or there is data but no end of transaction mark saved, then it is assumed that data is consistent and recovery is not needed. In the event that the transaction log file exists, and there is an end of transaction mark, the recovery procedure is applied. In this case, the recovery process is identical to the procedure taken by the sync manager 1012 to apply changes to protection card (standby) managed objects in a network that utilizes redundant card elements.

Each database in the managed object database system 1000 provides a means to identify itself. In one embodiment, each database includes the following attributes: a shelf identifier, a date and time of last change, an incremental number, and a version number. These attributes are saved in a data file reserved for database identity.

In one embodiment of the present invention, a database manager API (application program interface) is used to provide a messaging interface to external resources and interfaces. A transaction signal with a state TRANS_FINAL is sent to the database manager 1008 to trigger the persistent storage update to manage storing and restoring activity. In general, here is only one instance of the database manager class. It is derived from a generic OSE process.

A programming example of a list of important public functions is provided as follows:
Generic OSE process entities:
  Void Main( );
  Static Process* Creat( );
This function is called in the event of booting the software:
  Void Load (CMO-SEARCH-DB& objectsMap, bool bIsActive);
This function is called in the event of booting the software after the power failure before Load( ):
  Void RollTxLogForward( )
These two functions are called to check whether the files supporting persistence are presented:
  Bool LogIsPresent( );
  Bool DBIsPresent( );
This function is used to check whether validation information is stored or not.
  Bool DbValidationIsPresent( );
This function is used to remove the transaction that is currently active for the Database Manager, it is just the wrapper of Transaction functionality.

Void ClearTransactionList( )
This function is used to obtain the data from the DbFile header.
  Static boolRetrieveSWReleaseFromDBFile (char*fileNameStr, Char*releaseStr);
Public data:
  Static char dbName[MAX_NUM_OF_CHAR_PER_LINE];
  Static char * tempName;
  Static bool dbLocked;
  Static char*dbValidation;

Note that for the above programming sequence, CMO stands for managed object. Identity attributes are to be checked when booting the system. Another checking procedure is to scan the data file similar to a loading procedure and check that the sum of page sizes is equal to the file size.

The data file may have unused spaces. This may make direct database file uploading-downloading unacceptable. In this case, objects are read one-by-one, and empty file blocks (marked as deleted) are skipped.

Figure 11:
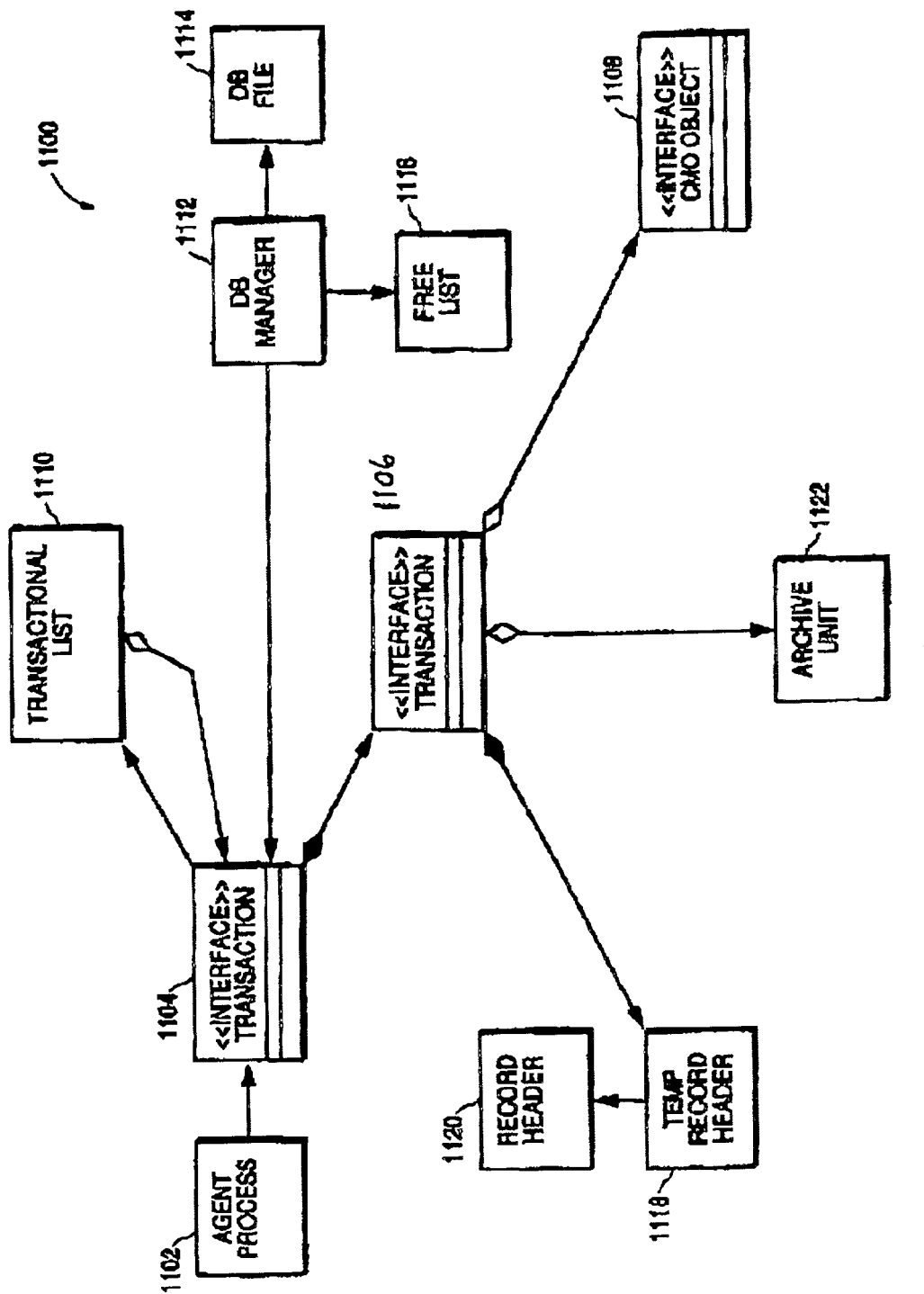
FIG. 11 is a logical diagram illustrating internal details of the managed object persistence design, according to one embodiment of the present invention.

A key attribute of the managed object database system is persistence of managed objects. FIG. 11 is a logical diagram illustrating internal details of the managed object persistence design, according to one embodiment of the present invention.

The agent process 1102 interfaces with the current transaction 1104 to perform an action 1106 on a managed object 1108. The transactions are stored in a transaction list 1110. Database manager 1112 maintains a database file 1114 and free list 1116. The action 1106 is referenced by a temporary record header 1118 and a database record header 1120. The database record header includes the fields managed object reference, deletion bit, record number, and size (in logical units). After the header the data is stored. The data part of the record following the header is a continuous data stream that includes all objects fields and all relationship pointers converted to the managed object, including all contained objects. The logical units are of fixed size of n characters in length. If the data plus the header information exceeds n characters, more logical units can be used to save the object contents.

A programming example of a record header class is provided as follows:

```
Class RecordHeader
Represents the object that is saved before every object's contents in
the data file.
class RecordHeader
{
  public:
    RecordHeader ( ) {
      nRecordSize = 0; nRecNum = -1; bDeleted = false;
cmoRef.SetDefault ( ); bIsOptical = true; }
    void Default ( ) { nRecordSize = 0; nRecNum = -1; bDeleted =
false; cmoRef.SetDefault ( ); }
    const bool IsDeleted ( )
          { return bDeleted; }
    void SetDeleted (const bool val)      { bDeleted = val; }
    const U16 RecordSize ( )              { return nRecordSize; }
    void SetRecordSize (const U16 size)  { nRecordSize = size; }
    const long RecordNumber ( )           { return nRecNum; }
    void SetRecordNumber (const long recNum)
{nRecNum = recNum; }
    const bool IsOptical ( )              { return bIsOptical; }
    void SetOptical (const bool val)      { bIsOptical = val; }
    CMORef cmoRef;        // what object is to follow
    bool bIsOptical;      // to find if the object is from optical or
DS3 entity
  protected:
      bool bDeleted;    // Indication if object is deleted
```

```
  private:
      U16 nRecordSize;        // how many pages occupied
      long nRecNum;           // Its' own page number
};
Class TempRecordHeader
Represents the object that is saved before every object's contents in
the Tx log file
nRecNum contains the old position (to set deleted bit)
nNewrecNum contains the new position where the changes go
nRecordSize has the number of pages to save
class TempRecordHeader: public RecordHeader
{
    public:
        TempRecordHeader ( ) { nNewRecordSize = 0;
nNewRecNum = -1; arcLen = 0; }
        void SetData (bool isDel, CMORef& cmoRef, int dataLen)
);
    }
        const long NewRecordNumber ( )     { return
        nNewRecNum; }
        void SetNewRecordNumber (const long recNum)
    { nNewRecNum = recNum; }
        const U16 NewRecordSize ( )        { return
        nNewRecordSize; }
        void SetNewRecordSize (const U16 recSize)
    { nNewRecordSize = recSize; }
        const int ArcLen ( ) const               { return arcLen; }
        void SetARcLen (const int len)           { arcLen = len; }
    private:
        U16 arcLen;
        U16 nNewRecordSize;
        long nNewRecNum;    // Log file needs to know the new
position to save updated data
};
```

The free space list keeps the track of records in the file that are available for information storage. When a record is marked for deletion, a new item representing this record is automatically put on this list. The free space list is formed when the database is read into memory the first time. When a new or modified record needs to be written, this list provides the position of available storage of the needed size. Low-level processes typically overlook this list and join together adjacent free spaces.

Each managed object modifying action is stored to an action list. The database manager maintains only one such list. The object's pointer is saved on the list if the object has been changed in any way. Each object is provided with a deleted bit and dirty bit, which serve to indicate what has been done to the object. If the database position is negative, it means that the object was just created.

A programming example of an Action class is given below. The action class represent an object that is modified or otherwise affected during a transaction. It combines a pointer on the changed object and the buffer where the contents will be saved.

```
Class Action
{
  public:
    Action (CMORef& CMORef);
    -Action( )
    ArchiveUnit *ar; //used to store object origin for rollback
and modified object for Tx
    NamedCMO* pNamedCMO;
    OpCode opcode;
    CMORef cmoRef;
    TempRecordHeader tempHeader;
};
```

In the above programming example, NamedCMO is the base class of every single managed object in the system. In essence, it is a template of every single managed object. The TempRecordHeader contains the old and new record number and sizes of the managed objects (CMO). This allows recalculation of moved items and facilitates the persistent support feature of the managed object database system.

Read and write operations to the database are done in logical units. The position in the file is located and then one logical unit is read. The record header structure is located at the beginning of the logical unit. The size of the data is obtained from the record header. If it exceeds the size of the unit, the necessary number of units is additionally read. With the proper adjusted size of the logical unit, most of the objects can be retrieved in one operation.

For database write operations, a log(temporary) file is used ensure recoverability unless a mechanism is provided to substitute it. Every write operation is made to an unused area of memory (disk). On the first pass will managed object actions are written to the log file. Unused (released or new) data units are used to save modified data, except data that has been deleted. Found unused unit numbers are saved to the log file along with modified data, to provide the information for the recovery operation. On the second pass the changes are saved to the data file, modified records are marked deleted, and new content is written to unused unit.

Persistence Support

Figure 12:
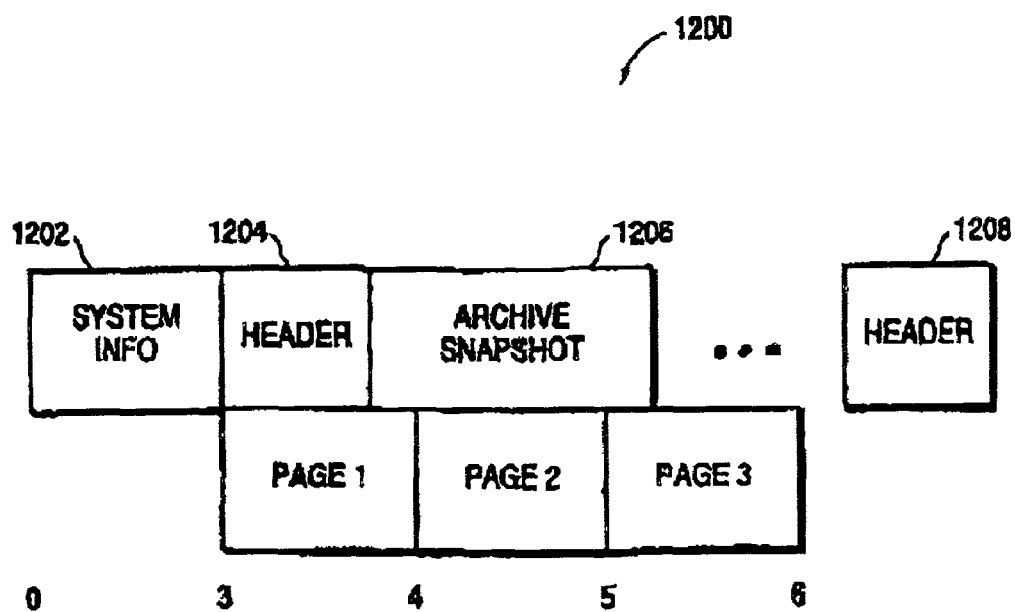
FIG. 12 illustrates the file system associated with the persistence support function, according to one embodiment of the present invention.

The persistence support feature allows recovery from conditions such as initial start-up conditions or from power-out or similar emergency conditions. This allows the configuration information for the network to be restored. The managed object database system facilitates persistence support of the managed objects. FIG. 12 illustrates the file system associated with the persistence support function, according to one embodiment of the present invention. Information related to the objects is saved in pages, denoted Page 1, Page 2, and Page 3 in diagram 1200. Each page can be n bytes (e.g., 128 bytes), and each object can occupy any number of pages. Each object has a header 1204. The header stores the managed object reference (CMORef), the record number, size, and the deleted bit.

When the database manager begins to process a transaction, it first processes the header 1204 and places the archive 1206 in the appropriate location, such as in archive unit 1122. The database manager maintains a free space list. The free space lists the record number and size of deleted objects that are available for use. When an object is deleted, its deleted bit is set, and the object is placed on the free space list.

An important aspect of the persistence support feature is the loading to load the configuration data after a power-up or recovery operation. Every time the system is booted, a load operation occurs. The load operation comprises the steps of object allocation, contents restoration, and initialization. The initialization step consists of setting default attributes and initializing the hardware. The object allocation step recreates the map. This is done by parsing the header and determining the size of the object. A corresponding amount of space in memory is then pre-allocated for that object.

During the contents restoration step, the archive containing the snapshot content of the object is restored. The managed object reference is determined from the pointer on the map. During restoration, all attributes for the object are filled out. If two objects contain pointers to one another, as shown in FIG. 2A, the key of the object is saved in the archive rather than the pointer. Saving the pointer to the file alone is not sufficient, because upon re-booting, the allocation can change. The process that takes the snapshot of the managed objects, referred to as the "serialize" process, saves the key of the object being pointed to rather than the pointer of the object being pointed to. For example, in FIG. 2A, when a snapshot of object A is saved, the key for object B (kB) is saved to the map. Thus, during loading, the key is loaded and this provides the pointer.

During the process of restoration, when the archive is accessed, the key to the managed object is provided. This key allows access to the map that provides the pointer to the object and allows linking of the objects. The process of rebuilding the links among the managed objects in the system eliminates the need to look up the attributes of each object in a map on a one-by-one basis, and is therefore a faster method of access.

In one embodiment of the present invention, a two-step commit process is executed to save a transaction on a file. In general, a two-step commit is used on network elements such as on-line transaction processing servers.

Figure 13:
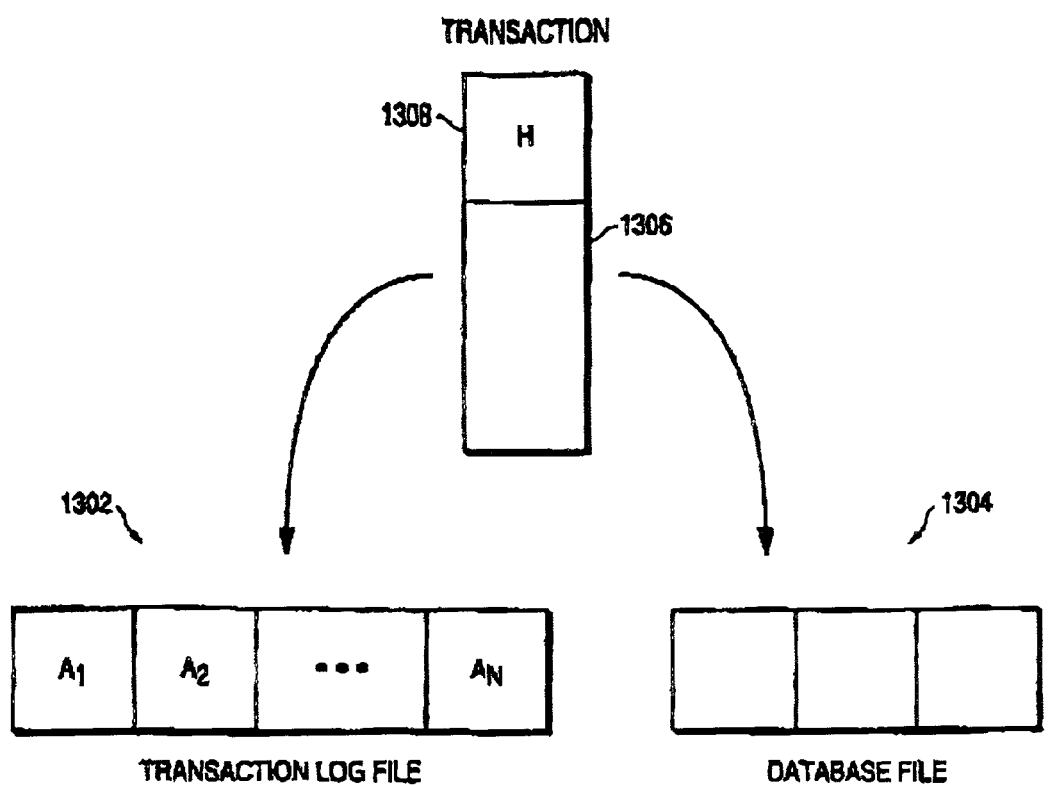
FIG. 13 is a diagram illustrating the transaction log file and database file for the two-step commit process illustrated in FIG. 14, according to one embodiment of the present invention.

The two-step commit process utilizes two files in which the actions comprising each transaction are saved. FIG. 13 is a diagram illustrating the transaction log file and database file for the two-step commit process illustrated in FIG. 14, according to one embodiment of the present invention. The transaction 1306 is marked by a header 1308. The action contents of the transaction 1306 are written to both a transaction log file 1302 and a database file 1304. The database 1304 stores the object and archive snapshots for the transaction 1306. The transaction log file 1302 contains a sequential list of actions for the saved transaction 1306. These are denoted, A1, A2, and so on, in FIG. 13. Each action in the transaction log file has associated with it a new and old position within the database file. This provides a picture of how an object is changed in the database file. In one embodiment, the database file 1304 is maintained in dynamic memory so that it is vulnerable to power outage conditions. The transaction log file is saved in static memory or non-volatile memory so that its contents are not lost during power down conditions.

Figure 14:
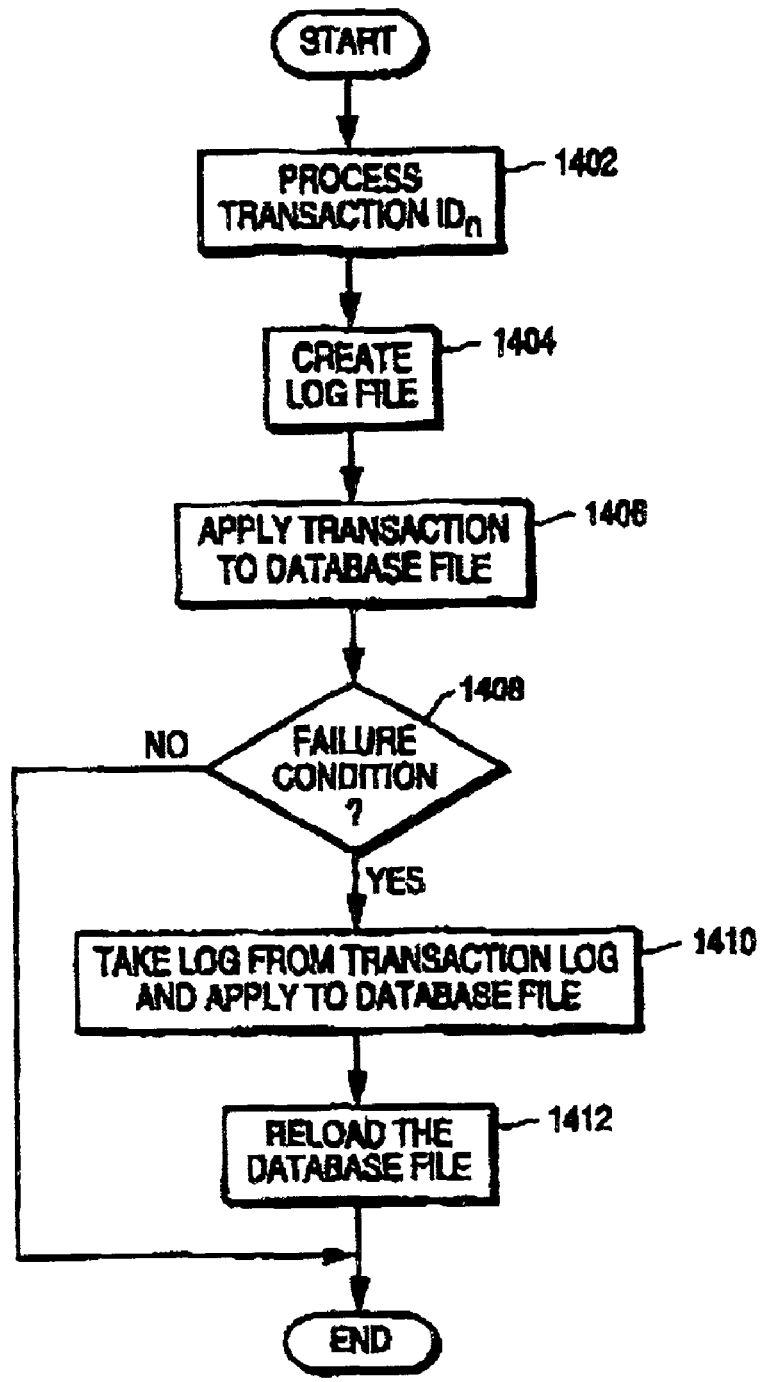
FIG. 14 is a flowchart that illustrates the steps for a two-step commit process, according to one embodiment of the present invention.

FIG. 14 is a flowchart that illustrates the steps for a two-step commit process, according to one embodiment of the present invention. When the database manager processes a particular transaction with a particular ID number (Tx(IDn)), a log file is first created, step 1404. The transaction is also applied to a database file, step 1406. If there is an abort or failure condition (e.g., a power failure) during the database file update step, the database file will be corrupted. In step 1408, it is determined whether such a failure condition occurs. If a failure condition occurred, the database file 1304 likely has either been erased or is fatally corrupted. In this case, the log is taken from the transaction log file 1302 and applied to the database file to restore the contents of the database file to its state prior to the failure, step 1410. The database file is then reloaded into memory, step 1412, and the two-step commit process ends.

Synchronization

Many communication networks, such as the SONET network, support redundant network paths to support back-up functionality. In one embodiment of the present invention, the managed object database system incorporates processes that allows the efficient synchronization of parallel databases for a redundant network structure in a single network element. For this embodiment, a first network card and second network card maintain identical copies of the configuration database of the managed objects of the network. To ensure proper operation and redundancy, updates or changes to both databases must be synchronized so that the configuration data remains identical in both network cards.

In general, synchronization state machines within the network elements manage the synchronization of the databases. If a database is modified in one element or network card, the modified database is copied to the second network element. The second element then reboots and the databases are then synchronized. With reference to FIG. 10, the sync manager 1012 is the process that handles the synchronization activity between the databases and updates the standby managed objects. When the agent process on the first network element closes a transaction, it sends a message to the sync manager 1012. The sync manager then accesses the transactions and copies these to the memory of the second network element. The configuration manager and sync manager on the second card then recreates the transactions on the second network element and rolls the transactions forward to update the managed objects on the second element. Thus changes are made on the second network element based on the snapshot taken from the first network element.

For one embodiment, in a SONET network element with a working card and a standby card, the first card includes a sync manager that is in an active state (working card), and the second card includes a sync manager that is in a protection state (standby card). The active sync manager transmits database configuration and transaction information to the protection sync manager. The configuration manager 1002 initiates a synchronization operation after the agent process closes a transaction. The transaction identification number is sent from the configuration manager 1002 to the active sync manager 1012. In general, all transactions are synchronized between the active and standby ring databases to provide a "hot" sync feature that captures up-to-date transactions.

In this manner, transactions are updated between the first card and the second card on an incremental transaction-by-transaction basis. This provides a level of efficiency and speed over present network element synchronization methods that rely upon the wholesale copying of database files from the first database to the second database followed by a reload operation.

For a SONET network, only the sync manager process on the standby card receives transaction updates from the active card. If the standby card becomes the active card, the sync manager on the standby card becomes active.

Although some of the figures and associated description are largely directed to embodiments that utilize technology that is specific to fiber optic networks and SONET based networks, in particular, it should be noted that embodiments of the present invention can also be used in the context of other networked systems, that implement managed objects and configuration memory storage.

In the foregoing, a database system for managing logical objects within a network system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system of managing a configuration database within a network management program for a SONET ring network, the system comprising:
   a plurality of managed objects representing logical representations of network entities containing hardware processors that can be configured and modified through transactions executed by the network management program, wherein one or more of the managed objects include an object reference and a storage location pointer to another of the managed objects, the another of the managed objects being accessed by a combination of the object reference and the storage location pointer associated with the one or more of the managed objects;
   an agent process that receives transaction commands from a command handler;
   a database manager that receives the transaction commands from the agent process;
   a database file that stores commands from the database manager; and
   a transaction log file that stores actions included within transactions issued by the database manager.

2. The system of claim 1, wherein logical dependencies among each of the managed objects are maintained through the linking of the storage location pointers in the managed objects.

3. The system of claim 2, wherein actions that modify the managed objects are stored in the database file and the transaction log file.

4. The system of claim 3, wherein, in the event of an abort condition, a most recent configuration state of the network is restored by re-applying the transactions stored in the transaction log file, and resolving the pointer links contained in affected ones of the managed objects.

5. The system of claim 3, further comprising a free space list maintained by the database manager, the free space list containing record number and size information for the managed objects that have been deleted and are available for use.

6. The system of claim 5, wherein a present state of the managed objects is stored in a memory buffer upon modification by one or more the actions comprising one of the transactions.

7. The system of claim 1, wherein the one of more of the managed objects is accessed through direct links through the another of the managed objects.

8. An apparatus for managing a configuration database within a network management program for a computer network, the apparatus comprising:
   a hardware processor of the apparatus embodying:
     a loader module for loading a plurality of managed objects into system memory of the computer network upon a start-up event of the computer network,
       wherein a first one of the managed objects includes object reference information and pointer information in order to access at least a second one of the managed objects;
     an agent process for creating new transactions or opening existing transactions affecting one or more of the managed objects modified by the transactions;
     a database manager that receives the transaction commands from the agent process;
     a database file that stores commands from the database manager;
     a transaction saving module for saving the transactions in non-volatile memory; and
     a recovery module for restoring previous transactions executed prior to a failure condition.

9. The apparatus of claim 8, further comprising a memory map storing the object reference information and the pointer information for each of the managed objects.

10. The apparatus of claim 9, wherein the computer network comprises a parallel ring network including a first working network and a second standby network coupling each network element in the network.

11. The apparatus of claim 10, wherein the agent process comprises one of an alarm manager process, an automatic protection process, and a configuration manager program.

12. The apparatus of claim 11, wherein the computer network is a SONET ring network, and the managed objects comprise portions of control cards within nodes of the computer network.

13. The apparatus of claim 8, wherein the at least second one of the managed objects is accessed through direct links through the at least the first one of the managed objects.

14. A system of managing a configuration database within a network management program for a SONET ring network including an active network coupled in parallel to a standby network, the system comprising:
- a plurality of managed objects representing logical representations of network entities containing hardware processors that can be configured and modified through transactions executed by the network management program, wherein at least a first one of the managed objects includes object reference information and pointer information in order to access at least a second one of the managed objects;
- an agent process that receives transaction commands from a command handler;
- a database manager that receives the transaction commands from the agent process;
- a database file that stores commands from the database manager in the active network;
- a transaction log file that stores actions included within transactions issued by the database manager; and
- a synchronization manager that writes the actions included within the transactions to a synchronization database stored on the standby network.

15. The system of claim 14, wherein each managed object includes an object reference key and a storage location pointer and wherein logical dependencies among objects are maintained through the linking of storage location pointers in the managed objects.

16. The system of claim 15, wherein actions that modify the managed objects are stored in the database file and the transaction log file.

17. The system of claim 16, wherein, in the event of an abort condition, the most recent configuration state of the network is restored by re-applying the transactions stored in the transaction log file, and resolving the pointer links contained in the affected managed objects.

18. The system of claim 16, further comprising a free space list maintained by the database manager, the free space list containing record number and size information for the managed objects that have been deleted and are available for use.

19. The system of claim 18, wherein the present state of the managed objects on the active network is stored in a memory buffer upon modification by one or more the actions comprising one of the transactions.

20. The system of claim 19, wherein the present state of managed objects on the standby network are updated by the synchronization manager upon occurrence of a failure condition of the active network.

21. The system of claim 14, wherein the at least second one of the managed objects is accessed through direct links through the at least the first one of the managed objects.

* * * * *